United States Patent
Lee et al.

(10) Patent No.: US 9,409,130 B2
(45) Date of Patent: Aug. 9, 2016

(54) SUBMERGED TYPE HOLLOW FIBER MEMBRANE MODULE AND METHOD FOR MANUFACTURING THE SAME

(75) Inventors: Moo-Seok Lee, Seoul (KR); Sung-Hak Choi, Suwon-si (KR)

(73) Assignee: KOLON INDUSTRIES, INC., Kwacheon-si (KR)

( * ) Notice: Subject to any disclaimer, the term of this patent is extended or adjusted under 35 U.S.C. 154(b) by 0 days.

(21) Appl. No.: 12/581,495

(22) Filed: Oct. 19, 2009

(65) Prior Publication Data
US 2010/0038301 A1 Feb. 18, 2010

Related U.S. Application Data

(63) Continuation of application No. PCT/KR2008/002284, filed on Apr. 23, 2008.

(30) Foreign Application Priority Data

Apr. 25, 2007 (KR) .......... 10-2007-0040261
Dec. 14, 2007 (KR) .......... 10-2007-0130855

(51) Int. Cl.
*B01D 63/02* (2006.01)

(52) U.S. Cl.
CPC ............ *B01D 63/022* (2013.01); *B01D 63/023* (2013.01); *B01D 63/024* (2013.01); *B01D 2315/06* (2013.01); *Y10T 156/10* (2015.01)

(58) Field of Classification Search
None
See application file for complete search history.

(56) References Cited

U.S. PATENT DOCUMENTS

| 6,592,759 B2 | 7/2003 | Rabie et al. |
| 6,685,832 B2 | 2/2004 | Mahendran et al. |
| 2002/0153299 A1* | 10/2002 | Mahendran et al. ..... 210/321.89 |
| 2003/0038075 A1 | 2/2003 | Akimoto et al. |

FOREIGN PATENT DOCUMENTS

| EP | 1 350 555 A1 | 10/2003 |
| JP | 2003-112016 A | 4/2003 |
| KR | 10-2004-0102204 A | 12/2004 |

OTHER PUBLICATIONS

Performance plastics technical data sheet, date unknown.*
Korean Patent Office, Korean Office Action issued in corresponding KR Application No. 10-2007-0130855, dated Jun. 21, 2013.

* cited by examiner

*Primary Examiner* — Krishnan S Menon
(74) *Attorney, Agent, or Firm* — Sughrue Mion, PLLC (57) ABSTRACT

A submerged-type hollow fiber membrane module and a method for manufacturing the same are disclosed, which is capable of realizing a great sealing strength between a module case and a bundle of hollow fiber membranes without an additional centrifugal molding apparatus. The method includes forming a bundle of hollow fiber membranes held together and fixed by a first potting material, wherein one end of each of the hollow fiber membranes is open; putting the bundle of hollow fiber membranes in a module case and fixing the bundle of hollow fiber membranes in the module case by forming a second potting material on the first potting material.

4 Claims, 9 Drawing Sheets

SUBMERGED TYPE HOLLOW FIBER MEMBRANE MODULE AND METHOD FOR MANUFACTURING THE SAME

CROSS REFERENCE TO RELATED APPLICATION

This application is a Continuation Application of International Application No. PCT/KR2008/002284 filed Apr. 23, 2008, claiming priority based on Korean Patent Application Nos. 10-2007-0040261 filed Apr. 25, 2007 and 10-2007-0130855 filed Dec. 14, 2007, the contents of all of which are incorporated herein by reference in their entirety.

TECHNICAL FIELD

The present invention relates to a hollow fiber membrane module utilized in a water treatment, and more particularly to a submerged-type hollow fiber membrane module and its potting process.

BACKGROUND ART

A water treatment for cleaning fluid by removing pollutants there from may use a heating method, a phase-changing method, or a separation membrane employing method.

The separation membrane employing method can realize high reliability since it is suitable for stably providing a desired water quality based on a size of pore formed in the separation membrane. Furthermore, it is unnecessary for the separation membrane employing method to perform a heating process. In this respect, the separation membrane employing method is advantageous in that it can be widely utilized in various separation processes using microbe that may be affected by the heating process.

The separation membrane may include a flat-type membrane having a flat cross section, and a hollow fiber membrane having a hollow therein. In case of the hollow fiber membrane, there are micro-pores provided on a surface of tubular fiber structure including inner and outer diameters therein, so that pollutants are filtered through the micro-pores included in the hollow fiber membrane. In comparison to the flat-type membrane, the hollow fiber membrane has the larger surface area owing to its inner and outer diameters. Accordingly, owing to the advantageous characteristics such as the large surface area of hollow fiber membrane, the hollow fiber membrane is widely utilized for the separation membrane in the recent applications of water treatment.

The hollow fiber membrane in type of a predetermined module is utilized in the water treatment, one type example of which is a submerged-type hollow fiber membrane module.

In order to form the submerged-type hollow fiber membrane module, the hollow fiber membrane module is submerged in a water tank filled with a fluid to be treated, and a negative pressure is applied to the inside of the hollow fiber membrane, whereby only fluid passes through minute pores of the hollow fiber membrane, thereby filtering out pollutants from the fluid by the minute pores included in the hollow fiber membrane.

The submerged-type hollow fiber membrane module is formed by steps of forming a bundle of hollow fiber membranes collected, and fixing the bundle of hollow fiber membranes in a module case, wherein theses steps are referred to as a potting process. When a sealing strength becomes weak between the module case and the bundle of hollow fiber membranes, the hollow fiber membrane module does not function properly due to the leakage of fluid. Accordingly, the potting process is a very important step in a method of manufacturing the submerged-type hollow fiber membrane module. In the related art, the potting process may be performed by a centrifugal molding method or immersion method.

In the centrifugal molding method, the plurality of hollow fiber membranes and the module case are put on a rotating body, a potting material is supplied to end portions of the hollow fiber membrane, and the rotating body rotates so as to fill the potting material in the plurality of hollow fiber membranes, thereby forming the bundle of hollow fiber membranes and fixing the bundle of hollow fiber membranes in the module case by the potting material.

This centrifugal molding method has the great sealing strength between the module case and the bundle of hollow fiber membranes since the potting material is filled in the hollow fiber membrane owing to the centrifugal force. However, the centrifugal molding method requires a cost for a centrifugal molding apparatus, for example, the rotating body and its driving apparatus. Whenever the module is changed in its size, it necessarily requires the replacement of parts in the centrifugal molding apparatus.

The immersion method performs the potting process without rotation. In case of the immersion method, after positioning the plurality of hollow fiber membranes in the module case, the potting material is supplied to the module case, whereby the potting material is charged in the hollow fiber membranes, thereby forming the bundle of hollow fiber membranes and fixing the bundle of hollow fiber membranes in the module case by the potting material.

The immersion method is advantageous in that it does not require a molding apparatus. However, the sealing strength between the module case and the bundle of hollow fiber membranes in the immersion method becomes lower than that in the centrifugal molding method.

DISCLOSURE

Technical Problem

It is an object of the present invention to provide a submerged-type hollow fiber membrane module and a method for manufacturing the same, which is capable of realizing a great sealing strength between a module case and a bundle of hollow fiber membranes without an additional centrifugal molding apparatus.

Technical Solution

A method for manufacturing a submerged-type hollow fiber membrane module is characterized in that: the method is comprised of forming a bundle of hollow fiber membranes held together and fixed by a first potting material, wherein one end of each of the hollow fiber membranes is open; putting the bundle of hollow fiber membranes in a module case; and fixing the bundle of hollow fiber membranes in the module case by forming a second potting material on the first potting material.

In addition, the method comprises forming a third potting material on the second potting material, wherein a hardness of the third potting material is lower than that of the second potting material.

At this time, the hardness of the third potting material is in a range between 20% and 60% in comparison to the hardness of the second potting material.

Also, the process of forming the third potting material is performed after completely curing the second potting material.

The process of forming the third potting material is performed after semi-curing the second potting material.

The process of forming the bundle of hollow fiber membranes comprises holding and fixing one end portions of the hollow fiber membranes by the first potting material; and forming the bundle of hollow fiber membranes by removing predetermined portions of the first potting material and the hollow fiber membranes, wherein one end of each of the hollow fiber membranes is on a level with a cutting plane of the first potting material.

Further, the method comprises sealing one end of each of the hollow fiber membranes before holding and fixing one end portions of the hollow fiber membranes by the first potting material.

The process of putting the bundle of the hollow fiber membranes in a module case comprises preparing the module case with a water-collecting portion and supporting portions above the water-collecting portion; positioning the bundle of hollow fiber membranes so as to make one open end of the hollow fiber membrane communicate with the water-collecting portion of the module case; and putting the first potting material with the bundle of hollow fiber membranes on the supporting portions of the module case.

In another aspect of the present invention, a method for manufacturing a submerged-type hollow fiber membrane module comprises forming a bundle of hollow fiber membranes held together and fixed by a first potting material, wherein one end of each of the hollow fiber membranes is open; putting the bundle of hollow fiber membranes in a module case; semi-fixing the bundle of hollow fiber membranes in the module case by covering the module case and the bundle of hollow fiber membranes with a second potting material, and semi-curing the second potting material; and completely fixing the bundle of hollow fiber membranes in the module case by covering the semi-cured second potting material with a third potting material, and completely curing the second and third potting materials.

The process of semi-fixing the bundle of hollow fiber membranes in the module case is performed by covering the first potting material with the second potting material, and semi-curing the second potting material, so as to semi-fix the module case, the first potting material and the plurality of hollow fiber membranes by the second potting material.

The process of completely fixing the bundle of hollow fiber membranes in the module case is performed by completely curing the second and third potting materials so as to make an adhesive layer comprised of the second potting material, an intermediate layer formed by a chemical combination of the second and third potting materials, and the third potting material, wherein the adhesive layer is used to completely fix the module case and the bundle of hollow fiber membranes.

The third potting material is made of an adhesive whose hardness is lower than that of the second potting material.

In another aspect of the present invention, a submerged-type hollow fiber membrane module comprises a module case provided with a water-collecting portions and supporting portions; a bundle of hollow fiber membranes held together and fixed by a first potting material, and put on the supporting portions, wherein one end of each of the hollow fiber membranes is open; and an adhesive layer for fixing the bundle of hollow fiber membranes in the module case.

At this time, the adhesive layer is comprised of a second potting material formed on the first potting material.

Also, the adhesive layer is comprised of a second potting material formed on the first potting material, and a third potting material formed on the second potting material, wherein the third potting material is formed of an adhesive whose hardness is lower than that of the second potting material.

Also, the adhesive layer is comprised of a second potting material formed on the first potting material, an intermediate layer formed on the second potting material, and a third potting material formed on the intermediate layer, wherein a hardness of the third potting material is lower than that of the second potting material, and the intermediate layer is formed by a chemical combination of the second and third potting materials.

The bundle of hollow fiber membranes is formed such that one end of each of the hollow fiber membranes is on a level with a cutting plane of the first potting material.

Advantageous Effects

The submerged-type hollow fiber membrane module according to the present invention and the method for manufacturing the same has the following advantages.

First, the method for manufacturing the submerged-type hollow fiber membrane module according to the present invention performs the potting process without using the centrifugal molding apparatus, so that it is possible to prevent the increase of cost. In addition, the bundle of hollow fiber membranes is firstly formed and is then fixed in the module case, thereby minimizing the leakage of fluid caused by the sealing failure between the module case and the bundle of hollow fiber membranes.

Second, the third potting material is formed on the second potting material, wherein the hardness of third potting material is lower than that of the second potting material. Thus, even though there are the repetitive frictions between the hollow fiber membrane and the third potting material due to the movement of the hollow fiber membranes, it is possible to minimize the damage of hollow fiber membranes.

Third, the second potting material semi-cured is covered with the third potting material, and the second and third potting materials are cured completely at the same time. Accordingly, the intermediate layer is formed between the second and third potting material by the chemical combination of the second and third potting materials, thereby enhancing the adhesiveness between the second and third potting materials, and preventing the third potting material from being separated from the second potting material.

Fourth, in case of the present invention, the permeating water flows without any interruption owing to the structure where each one end of the hollow fiber membranes is on a level with the cutting plane of the first potting material.

BEST MODE

The present invention is now understood more concretely by comparison between examples of the present invention and comparative examples. However, the present invention is not limited to such examples.

<Method for Manufacturing Submerged-Type Hollow Fiber Membrane Module>

First Embodiment

FIGS. 1 to 6 are cross section views schematically illustrating a method for manufacturing a submerged-type hollow fiber membrane module according to the first embodiment of the present invention.

Figure 1:
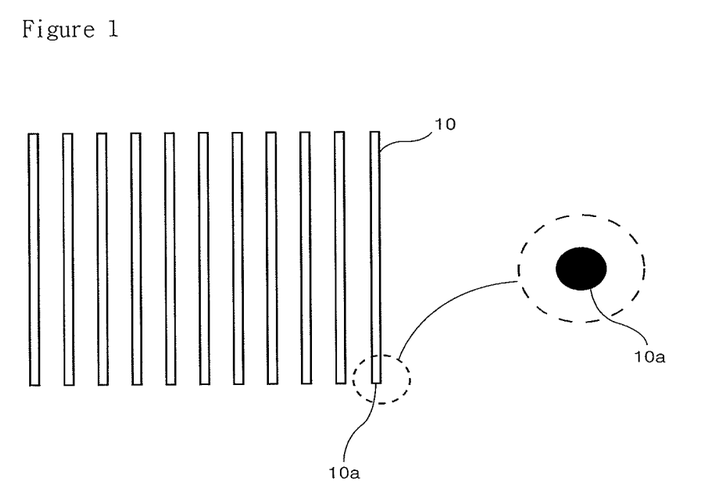
FIGS. 1 to 6 are cross section views schematically illustrating a method for manufacturing a submerged-type hollow fiber membrane module according to the first embodiment of the present invention.

First, as shown in FIG. 1, a plurality of hollow fiber membranes 10 are prepared, wherein one end 10a of each of the hollow fiber membranes 10 is sealed.

The hollow fiber membranes 10 may be used of various kinds of materials and types generally known to those skilled in the art.

The process of sealing one end 10a of each of the hollow fiber membranes 10 may be comprised of sealing one end 10a of each of the hollow fiber membranes 10 by submerging one end 10a of each of the hollow fiber membranes 10 in a sealant such as paraffin; or sealing one end 10a of each of the hollow fiber membranes 10 by heating one end 10a of each of the hollow fiber membranes 10. One end 10a of each of the hollow fiber membranes 10 is sealed to prevent a first potting material 20 from permeating into the inside of the hollow fiber membrane 10 through the hollow of the hollow fiber membrane 10 when submerging the hollow fiber membrane 10 into the first potting material 20 during the following step of FIG. 2.

However, it is not always necessary to seal one end 10a of each of the hollow fiber membranes 10. That is, even though the first potting material 20 permeates into the inside of the hollow fiber membrane 10 through the hollow 10 thereof during the following step of FIG. 2 due to the unsealed one end 10a of the hollow fiber membrane 10, it is possible to obtain the bundle of hollow fiber membranes whose one ends are open without permeation of the first potting material 20 by selecting a proper height of cutting-line (A-A line) when removing predetermined portions of the hollow fiber membranes 10 and the first potting material 20 completely cured during the step of FIG. 3. However, it is preferable that the process of sealing one end 10a of each of the hollow fiber membranes 10 be performed to decrease the amount of hollow fiber membranes 10 and ensure the openness in the end of the hollow fiber membrane 10.

Figure 2:
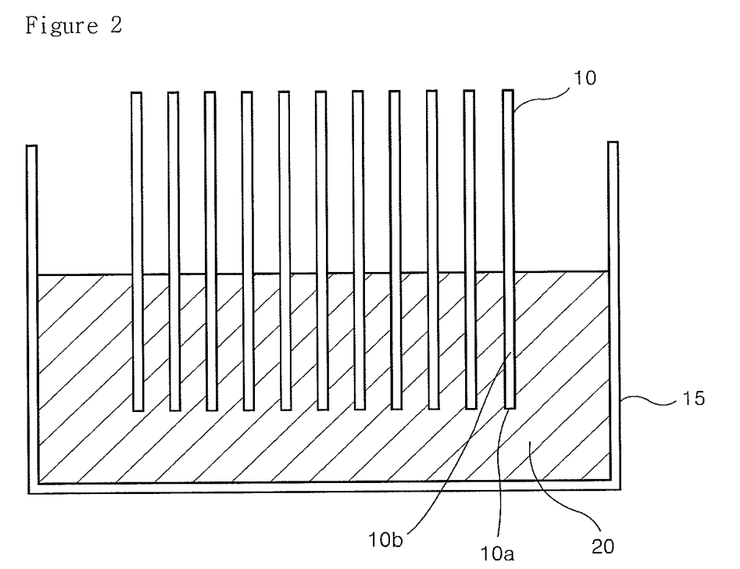

As shown in FIG. 2, one end portion 10b of each of the hollow fiber membranes 10 is submerged in the first potting material 20 of a potting jig 15. One end portion 10b of each of the hollow fiber membranes 10 indicates the predetermined portion including the sealed one end 10a of the hollow fiber membrane 10. The first potting material 20 enables the bundle of hollow fiber membranes 10 by holding and fixing the respective end portions 10b of the plurality of hollow fiber membranes 10 together, wherein the first potting material 20 may be used of urethane-based resin or epoxy-based resin, but it is not limited to this. Preferably, the first potting material 20 is formed of a hard adhesive with high hardness, for example, an adhesive with hardness (Shore A) between 95 and 100, so as to enhance the fixation in the plurality of hollow fiber membranes 10 and improve the sealing strength in the bundle of hollow fiber membranes.

After completely curing the first potting material 20, the plurality of hollow fiber membranes 10 are fixed by the first potting material 20, thereby forming the bundle of hollow fiber membranes. The process of completely curing the first potting material 20 is performed at a temperature between 20° C. and 60° C. for 1 to 24 hours, however, the curing conditions may be changed according to the kind of the first potting material 20.

Figure 3:
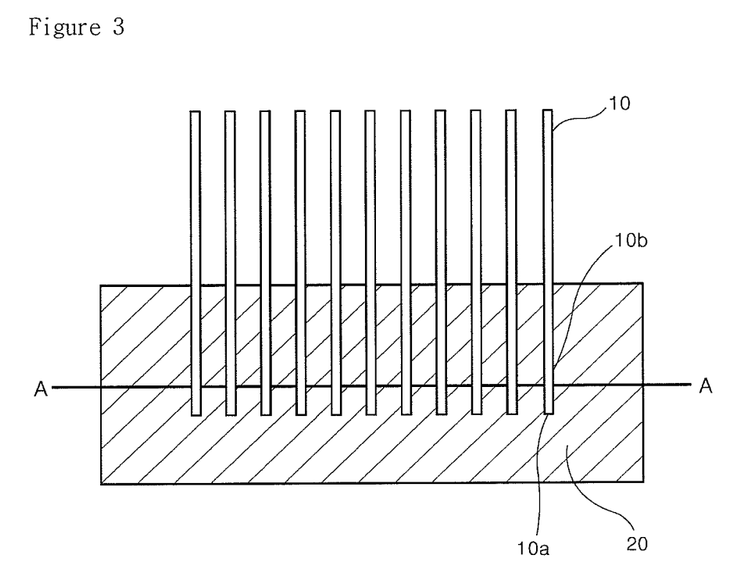

Next, as shown in FIG. 3, after separating the bundle of hollow fiber membranes, collected and fixed by the first potting material 20, from the potting jig 15, the separated bundle of hollow fiber membranes is cut along the line A-A, so as to remove the predetermined portions of the first potting material 20 and the hollow fiber membranes 10.

Figure 4:
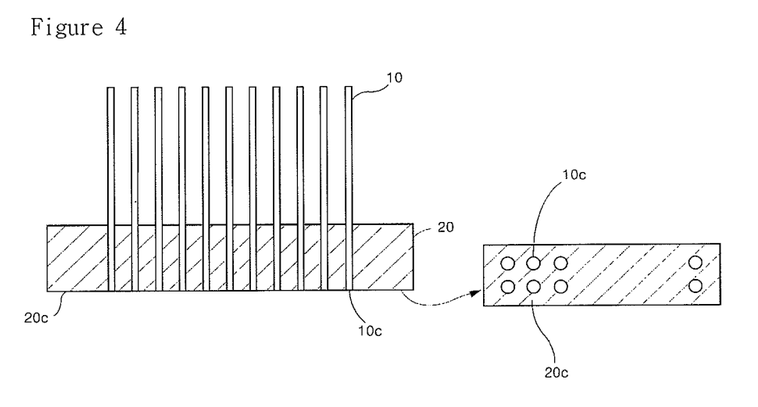

Referring to FIG. 4, when one end 10c of each of the hollow fiber membranes 10 is re-opened, the bundle of hollow fiber membranes is formed such that each one end 10c of the hollow fiber membranes 10 is on a level with the cutting plane 20c of the first potting material 20.

Figure 5:
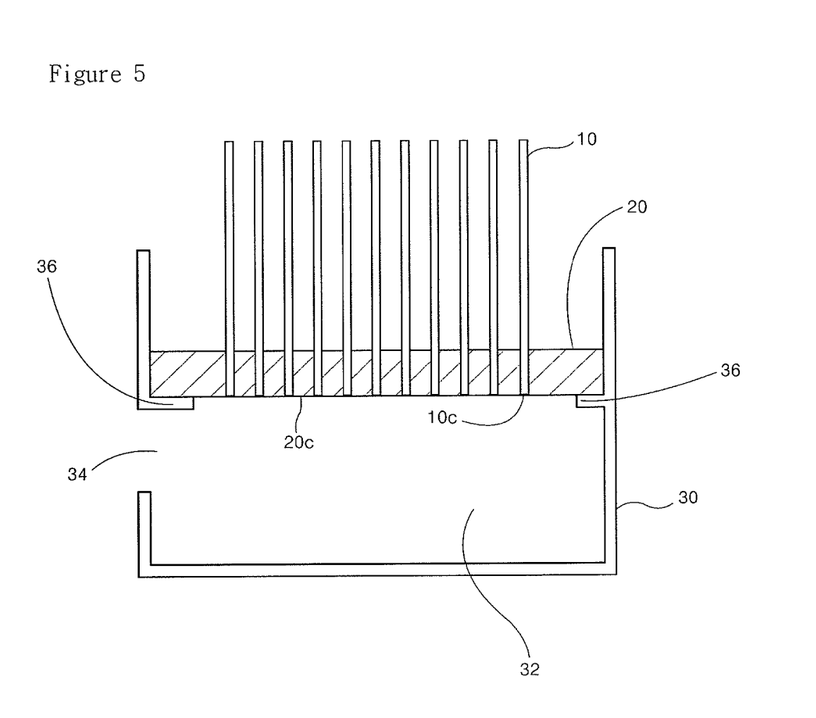

If one open end 10c of the hollow fiber membrane 10 protrudes more than the cutting plane 20c of the first potting material 20, the protruding portion of one open end 10c of the hollow fiber membrane 10 acts as a resistance to a flow of permeating water in a water-collecting portion (see '32' of FIG. 5). In case of the present invention, the permeating water flows without any interruption owing to the aforementioned structure where each one end 10c of the hollow fiber membranes 10 is on a level with the cutting plane 20c of the first potting material 20.

As shown in FIG. 5, the complete bundle of hollow fiber membranes are put in a predetermined module case 30.

The module case 30 is comprised of the water-collecting portion 32 for collecting the permeating water therein a discharging hole 34 for discharging the permeating water collected in the water-collecting portion 32; and supporting portions 36 positioned above the water-collecting portion 32.

The process of putting the bundle of hollow fiber membranes in the module case 30 includes steps of positioning the bundle of hollow fiber membranes whose one open end 10c is communication with the water-collecting portion 32 of the module case 30; and positioning the first potting material 20 with the bundle of hollow fiber membranes on the supporting portions 36 of the module case 30.

Figure 6:
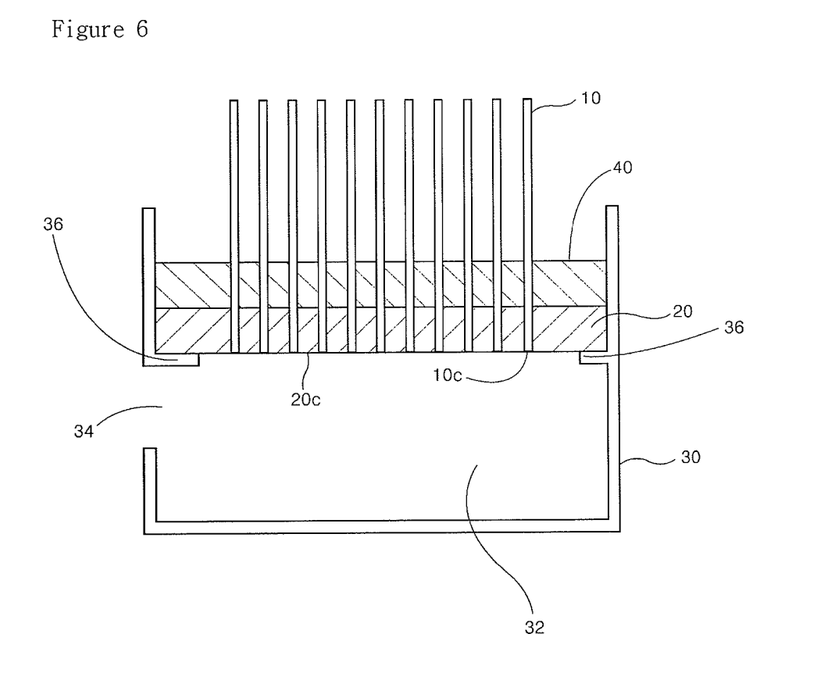

As shown in FIG. 6, a second potting material 40 is provided on the first potting material so as to fix the bundle of hollow fiber membranes in the module case 30, thereby completing the process for manufacturing the submerged-type hollow fiber membrane module according to the first embodiment of the present invention.

The process of fixing the bundle of hollow fiber membranes includes steps of covering the first potting material 20 with the second potting material 40; and completely curing the second potting material 40. This process enables the complete fixation of the module case 30, the hollow fiber membrane 10 and the first potting material 20 by the second potting material 40.

The process of completely curing the second potting material 40 may be performed at a temperature between 20° C. and 60° C. for 1 to 24 hours, however, the curing conditions of the process may be changed according to the kind of the second potting material 40.

The second potting material 40 fixes the bundle of hollow fiber membranes in the module case 30, wherein the second potting material 40 may be used of urethane-based resin or epoxy-based resin, but it is not limited to this. Preferably, the second potting material 40 is formed of a hard adhesive having strong adhesiveness, for example, an adhesive with hardness (Shore A) between 95 and 100, so as to enhance the fixation in the plurality of hollow fiber membranes and improve the sealing strength in the bundle of hollow fiber membranes.

Second Embodiment

FIGS. 7 to 10 are cross section views schematically illustrating a method for manufacturing a submerged-type hollow fiber membrane module according to the second embodiment of the present invention. Except that a third potting material is provided on a second potting material 40, the method according to the second embodiment of the present invention is identical to the method according to the first embodiment of the present invention.

Figure 7:
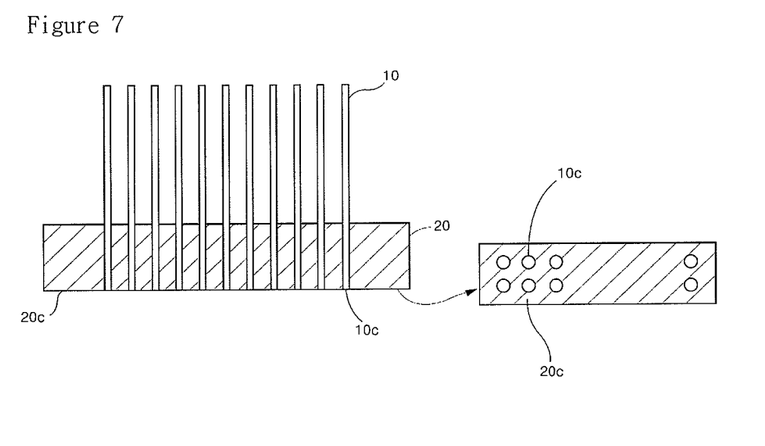
FIGS. 7 to 10 are cross section views schematically illustrating a method for manufacturing a submerged-type hollow fiber membrane module according to the second embodiment of the present invention.

First, as shown in FIG. 7, a plurality of hollow fiber membranes 10 whose one ends 10c are open are fixed by a first potting material 20, thereby forming a bundle of hollow fiber membranes.

The bundle of hollow fiber membranes is formed such that each one end 10c of the hollow fiber membranes 10 is on a level with a cutting plane 20c of the first potting material 20. The process of forming the bundle of hollow fiber membranes is identical to that of FIGS. 1 to 4.

Figure 8:
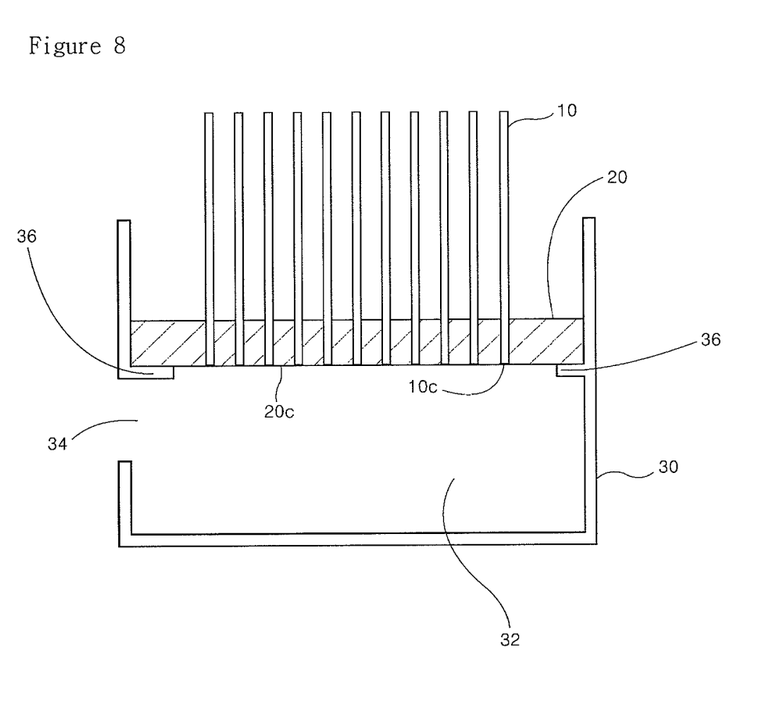

As shown in FIG. 8, the complete bundle of hollow fiber membranes is put in a predetermined module case 30. The process of putting the bundle of hollow fiber membranes in the predetermined module case 30 is identical to that of FIG. 5.

Figure 9:
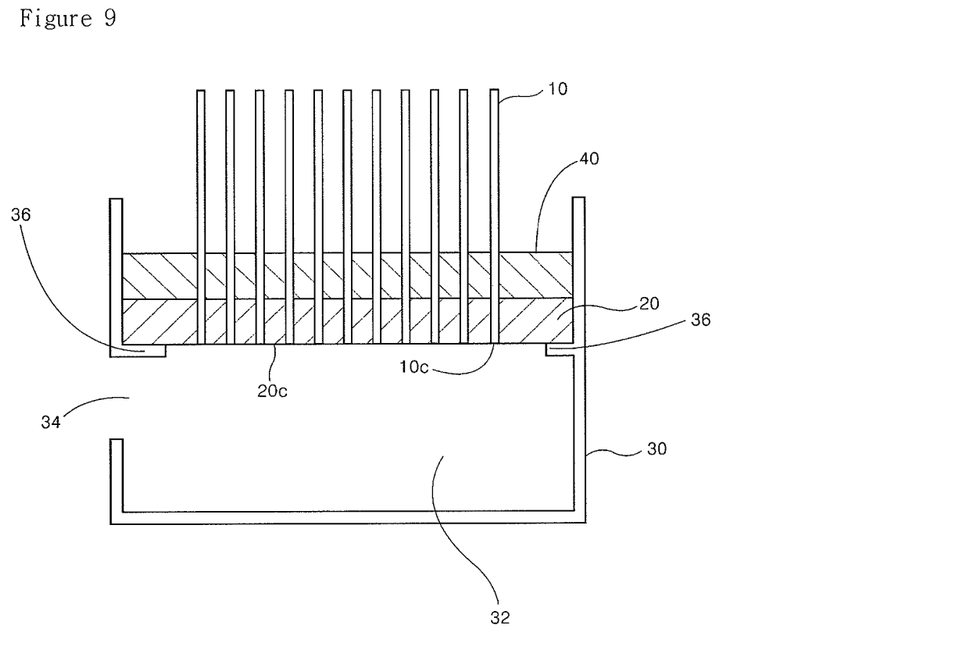

Next, as shown in FIG. 9, a second potting material 40 is provided on the first potting material 20, thereby fixing the bundle of hollow fiber membranes in the module case 30. The process of fixing the bundle of hollow fiber membranes in the module case 30 is identical to that of FIG. 6.

Figure 10:
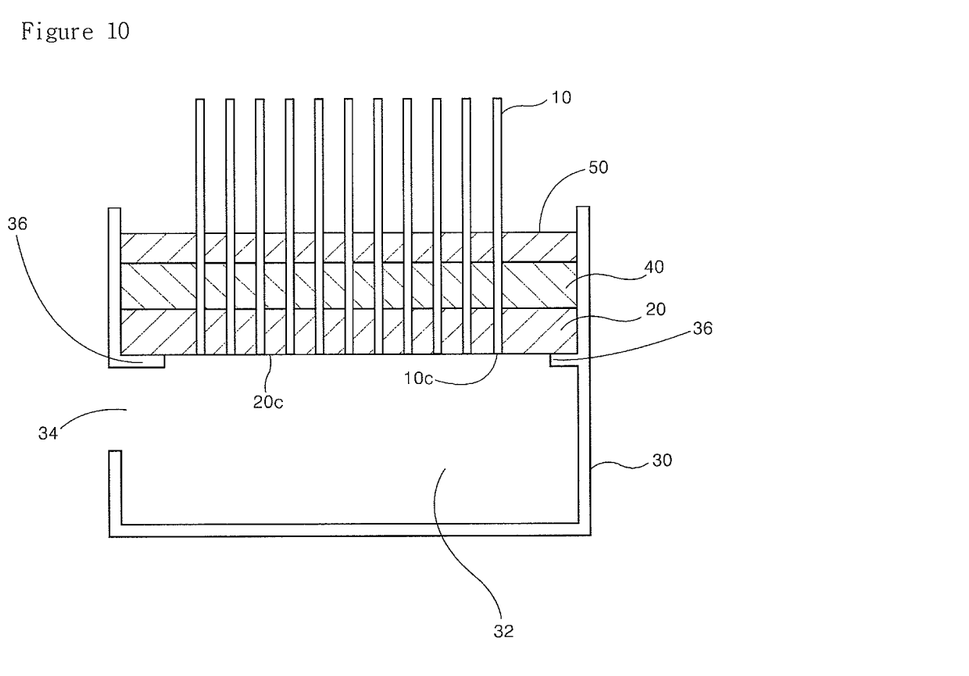

Next, as shown in FIG. 10, a third potting material 50 is provided on the second potting material 40, thereby completing the process for manufacturing submerged-type hollow fiber membrane module according to the second embodiment of the present invention.

After covering the completely-cured second potting material 40 with the third potting material 50, the third potting material 50 is cured completely.

If fixing the bundle of hollow fiber membranes in the module case 30 only by the second potting material 40, there may be damages in the predetermined portions of the hollow fiber membrane 10 just on the second potting material 40. That is, the hollow fiber membrane 10 may be moved due to the flow of fluid for a water treatment. In this case, if the hollow fiber membrane 10 is moved repeatedly, the predetermined portions of the hollow fiber membrane 10, positioned just on the second potting material 40, may be damaged due to the friction between the second potting material 40 and the hollow fiber membrane 10. Especially, if the second potting material 40 is formed of a hard adhesive having high hardness, the hollow fiber membrane 10 may be damaged easily.

Accordingly, if the friction occurs repeatedly between the bundle of hollow fiber membranes 10 and the module case 30 due to the moving hollow fiber membrane 10, it is necessary to provide a method for minimizing the damages of hollow fiber membrane 10 in its contact portion with the second potting material 40. In this respect, it is preferable to use the second potting material made of the adhesive having low hardness in the contact portion with the hollow fiber membrane 10.

In the second embodiment of the present invention, the third potting material 50 is additionally provided on the second potting material 40, wherein the third potting material 50 is formed of an adhesive whose hardness is lower than that of the second potting material 40. This enables minimization of the damage in the hollow fiber membrane 10 even though there are repetitive frictions between the third potting material 50 and the hollow fiber membrane 10.

Preferably, the hardness of the third potting material 50 is in a range between 20% and 60% in comparison to the hardness of the second potting material 40. This is because the adhesiveness and fixing strength may be lowered between the bundle of hollow fiber membranes and the module case 30 if the hardness of the third potting material 50 is lower than 20% of the hardness of the second potting material 40. Meanwhile, if the hardness of the third potting material 50 is higher than 60% of the hardness of the second potting material 40, it is difficult to realize the purpose for minimizing the damage of hollow fiber membrane 10.

Preferably, the third potting material 50 has the hardness (Shore A) between 20 and 40. The third potting material 50 may be used of urethane-based resin or epoxy-based resin, but it is not limited to this. The kind of base material for the third potting material may be selectively determined according to the second potting material 40.

Third Embodiment

FIGS. 11 to 15 are cross section views schematically illustrating a method for manufacturing a submerged-type hollow fiber membrane module according to the third embodiment of the present invention. Except that a third potting material 50 is additionally provided and semi-cured on a second potting material 40, the method according to the third embodiment of the present invention is identical to the method according to the first embodiment of the present invention.

Figure 11:
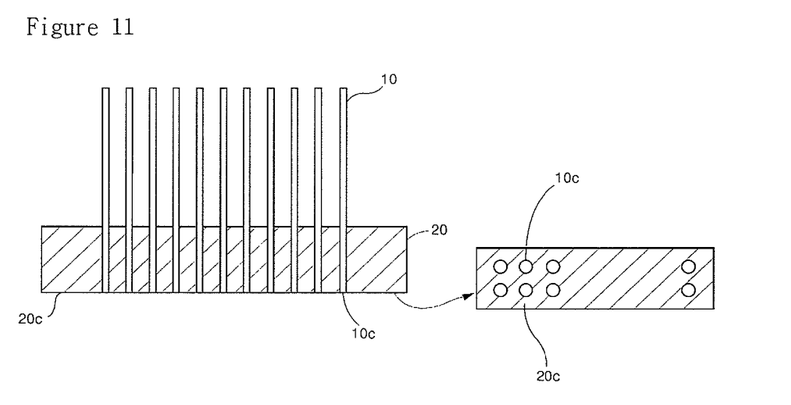
FIGS. 11 to 15 are cross section views schematically illustrating a method for manufacturing a submerged-type hollow fiber membrane module according to the third embodiment of the present invention and FIGS. 16 to 18 are cross section views schematically illustrating submerged-type hollow fiber membrane modules according to various embodiments of the present invention.

First, as shown in FIG. 11, a plurality of hollow fiber membranes 10 whose one ends 10c are open are fixed by a first potting material 20, thereby forming a bundle of hollow fiber membranes.

The bundle of hollow fiber membranes is formed such that each one end 10c of the hollow fiber membranes 10 is on a level with a cutting plane 20c of the first potting material 20. The process of forming the bundle of hollow fiber membranes is identical to that of FIGS. 1 to 5.

Figure 12:
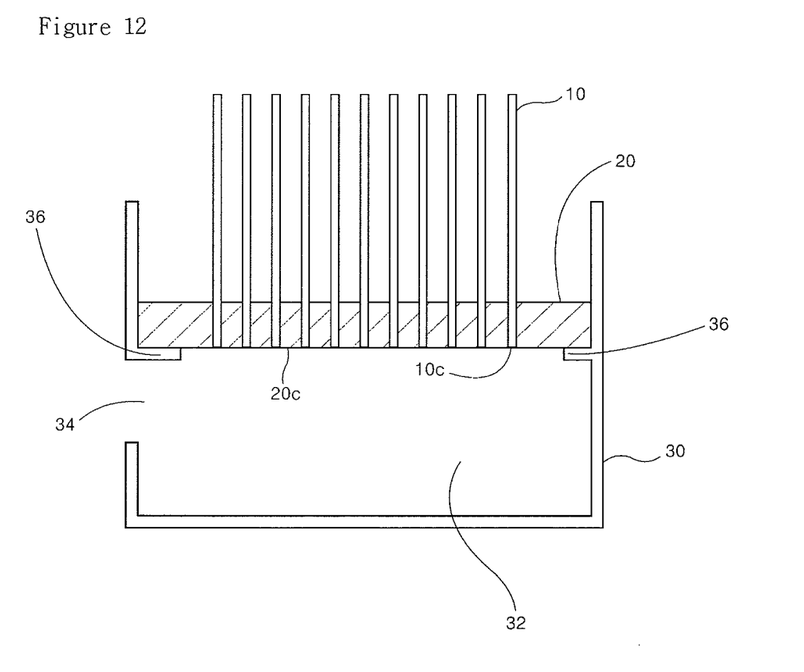

Next, as shown in FIG. 12, the complete bundle of hollow fiber membranes is put in a predetermined module case 30. The process of putting the bundle of hollow fiber membranes in the predetermined module case 30 is identical to that of FIG. 5.

Figure 13:
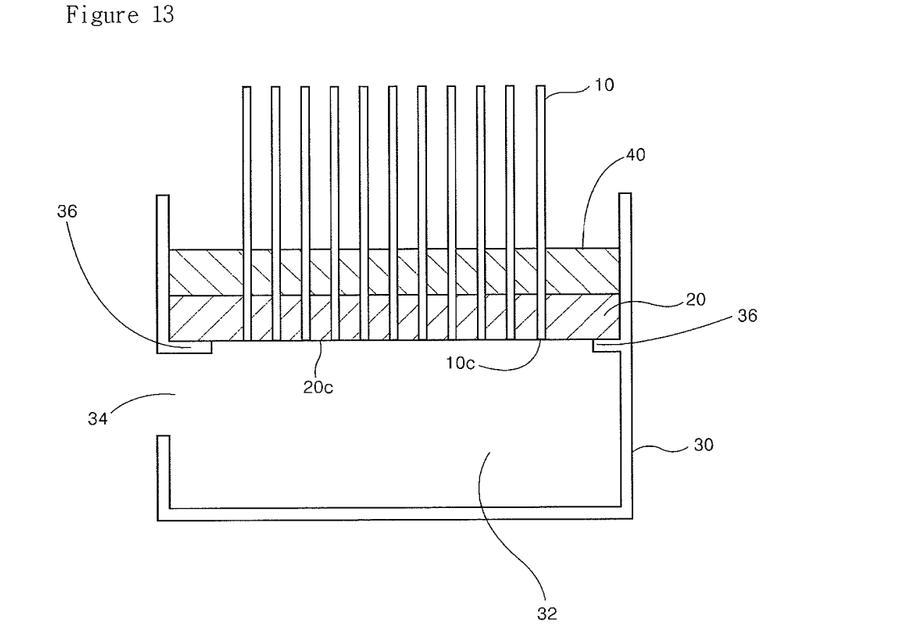

As shown in FIG. 13, a second potting material 40 is provided on the first potting material 20, thereby fixing the bundle of hollow fiber membranes in the module case 30. At this time, the process of fixing the bundle of hollow fiber membranes is comprised of covering the first potting material 20 with the second potting material 40 and semi-fixing the bundle of hollow fiber membranes by semi-curing the second potting material 40. The semi-curing process means that the second potting material 40 has a predetermined viscosity, instead of completely curing the second potting material 40. That is, there may be a chemical combination of the second potting material 40 semi-cured and other materials under the predetermined conditions.

According as the second potting material 40 is semi-cured, the first potting material 20 and the plurality of hollow fiber membrane 10 are maintained in a semi-fixation state by the second potting material 40. This semi-fixation state means that the first potting material 20 and the plurality of hollow fiber membrane 10 are not in a complete-fixation state.

Figure 14:
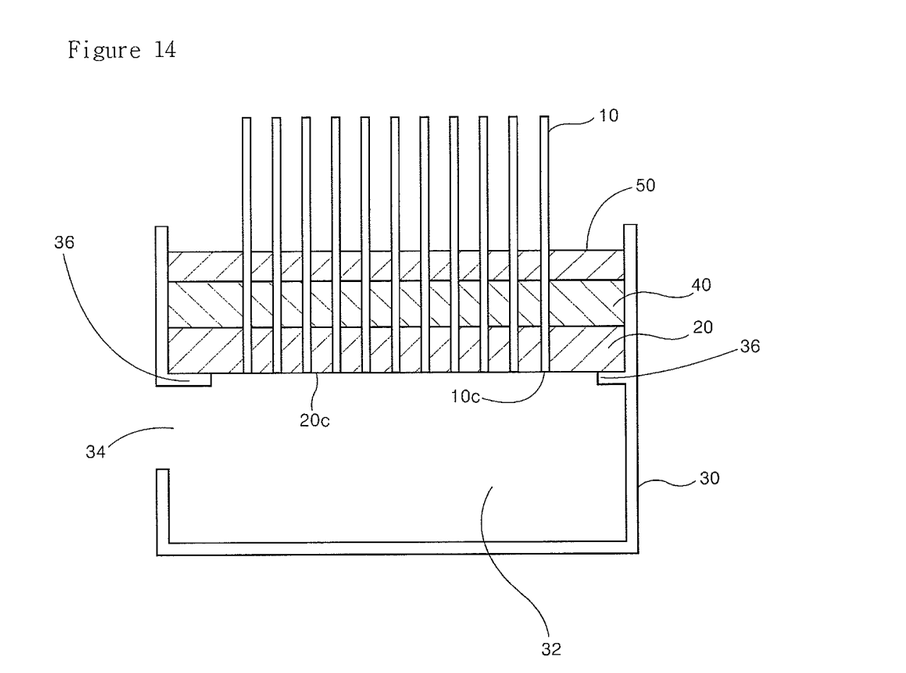

If completely curing the second potting material 40, the third potting material 50 may be easily separated from the second potting material 50 due to the weak adhesiveness between the second potting material 40 and the third potting material 50 when forming the third potting material 50 on the second potting material 40 for the step of FIG. 14. Thus, the method according to the third embodiment of the present invention enables improved adhesiveness between the second potting material 40 and the third potting material 50 by semi-curing the second potting material 40 and covering the semi-cured second potting material 40 with the third potting material 50.

The process of semi-curing the second potting material 40 is performed at a temperature range between 20 and 60° C. for 3 minutes to 1 hour, however, the curing conditions may be changed according to the kind of the second potting material 40.

The second potting material 40 fixes the bundle of hollow fiber membranes in the module case 30, wherein the second potting material 40 may be used of urethane-based resin or epoxy-based resin, but it is not limited to this. Preferably, the second potting material 40 is formed of a hard adhesive having strong adhesiveness, for example, an adhesive with hardness (Shore A) between 95 and 100, so as to enhance the fixation in the plurality of hollow fiber membranes and improve the sealing strength in the bundle of hollow fiber membranes.

As shown in FIG. 14, the second potting material 40 semi-cured is covered with the third potting material 50.

If fixing the bundle of hollow fiber membranes in the module case 30 only by the second potting material 40, there may be damages in the predetermined portions of the hollow fiber membrane 10 just on the second potting material 40. Thus, there is the additionally provided third potting material 50 whose hardness is lower than that of the second potting material 40, for the same reason as the aforementioned second embodiment of the present invention.

Preferably, the hardness of the third potting material 50 is in a range between 20% and 60% in comparison to the hardness of the second potting material 40. In more detail, it is preferable to use the third potting material 50 having the hardness (Shore A) of 20 to 40.

Figure 15:
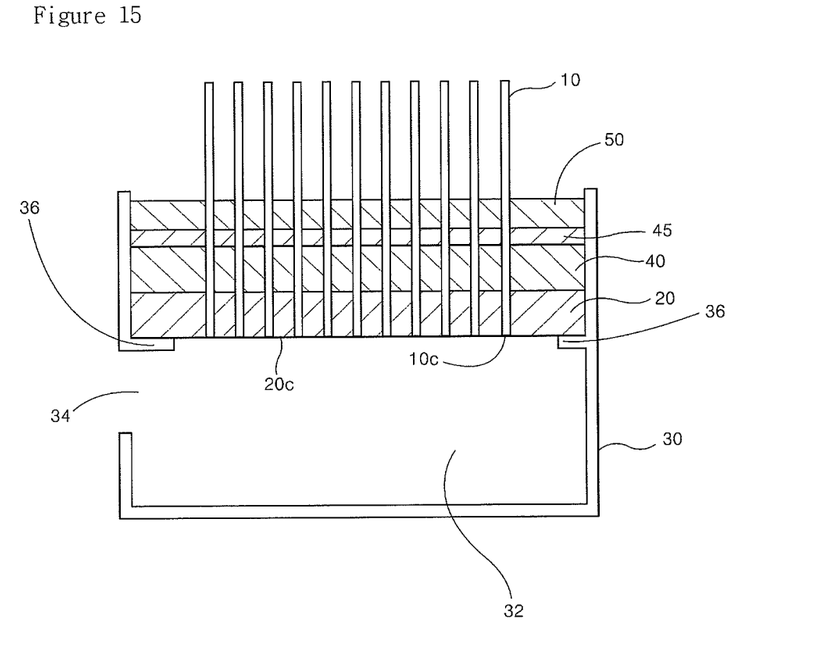

As shown in FIG. 15, the semi-cured second potting material 40 and the third potting material 50 covered thereon are cured completely, to thereby completely fix the bundle of hollow fiber membranes in the module case 30.

When completely curing the second and third potting materials 40 and 50, an intermediate layer 45 is formed between the second potting material 40 and the third potting material 50 by a chemical combination of the second and third potting materials 40 and 50. As a result, the adhesiveness improves between the second potting material 40 and the third potting material 50.

The process of completely curing the second and third potting materials 40 and 50 is performed at a temperature range between 20 and 60° C. for 1 to 24 hours, however, the curing conditions may be changed according to the kind of the second and third potting materials 40 and 50.

<Submerged-Type Hollow Fiber Membrane Module>

Figure 16:
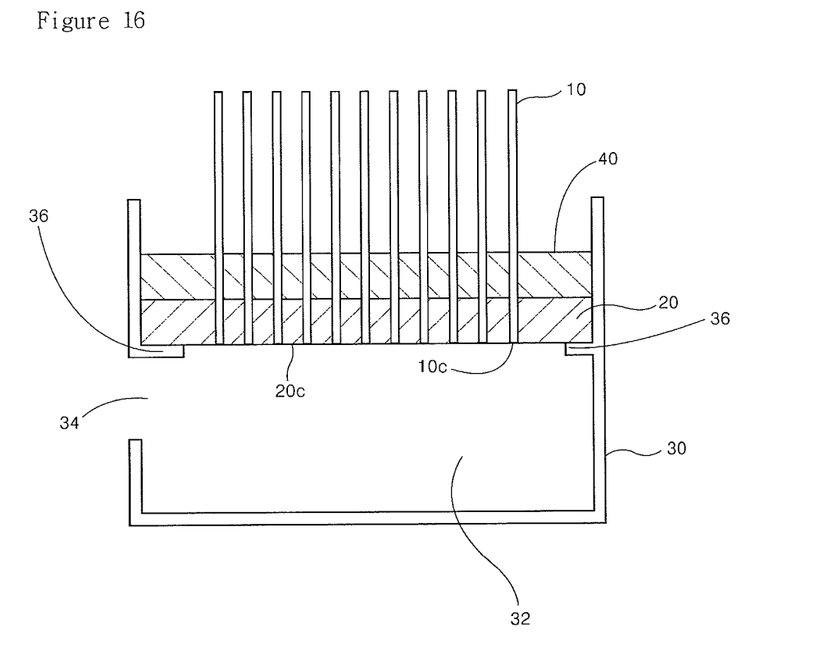
Figure 17:
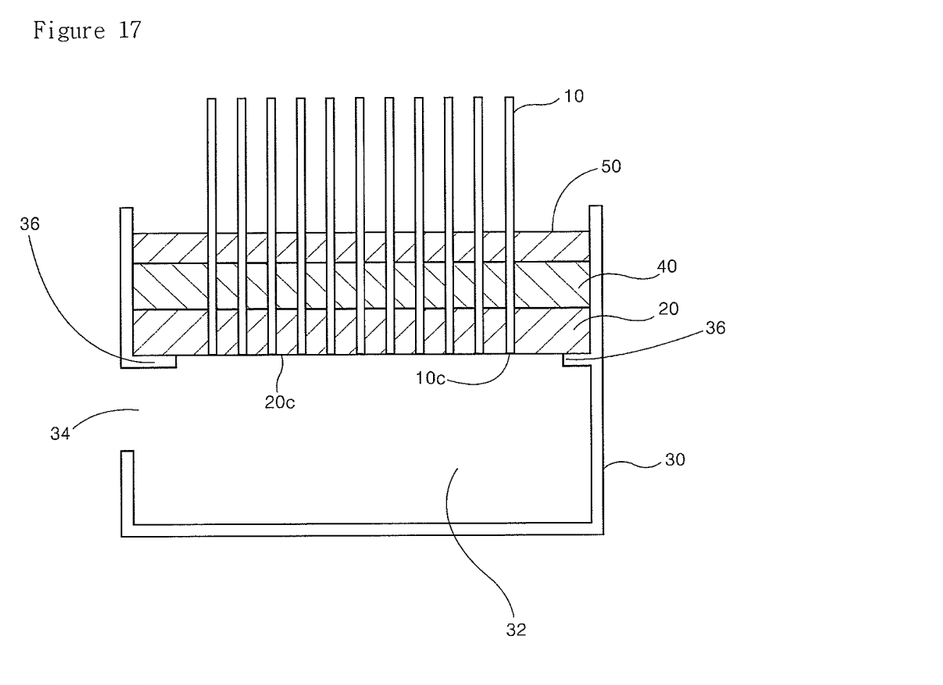
Figure 18:
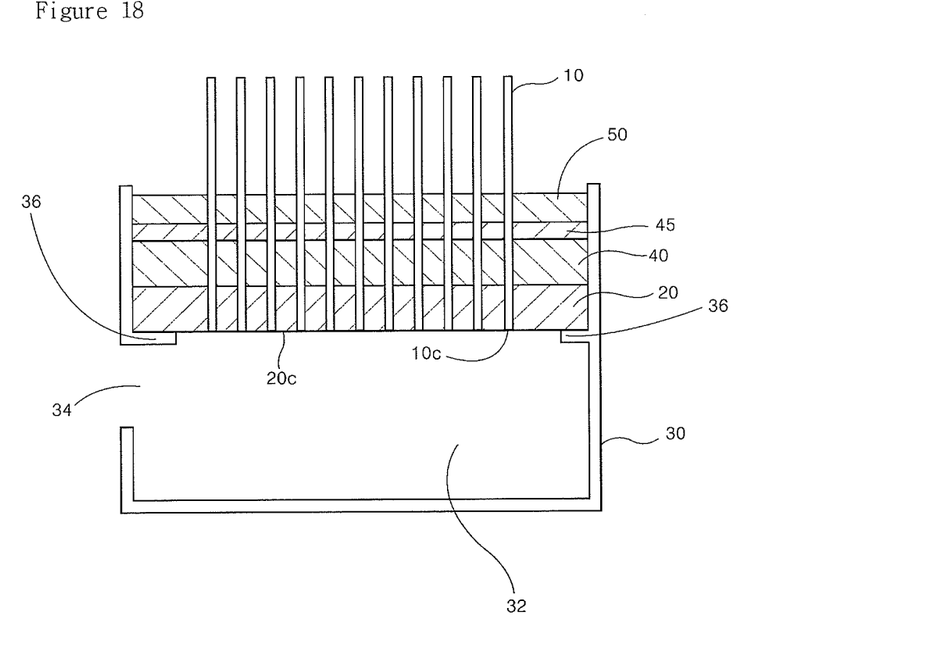

FIGS. 16 to 18 are cross section views schematically illustrating submerged-type hollow fiber membrane modules according to various embodiments of the present invention. FIGS. 16 to 18 respectively illustrate the submerged-type hollow fiber membrane modules manufactured according to the first to third embodiments of the present invention, but it is not limited to this.

As shown in FIGS. 16 to 18, the submerged-type hollow fiber membrane module according to the present invention includes a module case 30; and a bundle of hollow fiber membranes 10 which are put in the module case 30 and fixed by a first potting material 20.

The module case 30 is comprised of a water-collecting portion 32 for collecting permeating water therein a discharging hole 34 for discharging the permeating water collected in the water-collecting portion 32; and supporting portions 36 positioned above the water-collecting portion 32.

The bundle of hollow fiber membranes is supported by the supporting portions 36 of the module case 30. Each of the hollow fiber membranes 10 has one open end 10c which is in communication with the water-collecting portion 32 of the module case 30. Thus, the filtrated water is collected in the water-collecting portion 32 of the module case 30 through one open end 10c of the hollow fiber membrane 10, and is then discharged through the discharging hole 34 of the module case 30. Especially, since there is the first potting material 20 for fixing the hollow fiber membrane 10 on the supporting portions 36 of the module case 30, the filtrated water is collected in the water-collecting portion 32 of the module case 30.

In this case, there is no interruption in the flow of permeating water owing to the hollow fiber membranes 10 whose one ends are on the same level with the cutting plane 20c of the first potting material 20.

The first potting material 20 may be used of urethane-based resin or epoxy-based resin, but it is not limited to this. Preferably, the first potting material 20 is formed of a hard adhesive having high hardness, for example, an adhesive with hardness (Shore A) between 95 and 100, so as to enhance the fixation in the plurality of hollow fiber membranes 10 and improve the sealing strength in the bundle of hollow fiber membranes. As shown in FIGS. 16 to 18, the submerged-type hollow fiber membrane module according to the present invention includes an adhesive layer for fixing the bundle of hollow fiber membranes in the module case 30.

As shown in FIG. 16, the adhesive layer may be comprised of a second potting material 40 on the first potting material 20.

The second potting material 40 may be used of urethane-based resin or epoxy-based resin, but it is not limited to this. Preferably, the second potting material 40 is formed of a hard adhesive having high hardness, for example, an adhesive with hardness (Shore A) between 95 and 100, so as to enhance the fixation in the plurality of hollow fiber membranes 10 and improve the sealing strength in the bundle of hollow fiber membranes.

As shown in FIG. 17, the adhesive layer may be comprised of a second potting material 40 on the first potting material 20, and a third potting material 50 on the second potting material 40. In this case, the second potting material 40 is formed of a hard adhesive having high hardness, for example, an adhesive with hardness (Shore A) between 95 and 100, as mentioned above. The third potting material 50 is formed of an adhesive whose the hardness is lower than that of the second potting material 40, so as to minimize the damage of hollow fiber membrane 10 caused by the friction. Preferably, the hardness of the third potting material 50 is in a range between 20% and 60% in comparison to the hardness of the second potting material 40. That is, it is preferable to use the third potting material 50 of urethane-based or silicon-based resin having the hardness (Shore A) between 20 and 40, but it is not limited to this.

As shown in FIG. 18, the adhesive layer may be comprised of a second potting material 40 formed on the first potting material 20, an intermediate layer 45 formed on the second potting material 40, and a third potting material 50 formed on the intermediate layer 45.

The second and third potting materials 40 and 50 are formed of the same materials as those explained above.

The intermediate layer 45 may be formed by the chemical composition between the second potting material 40 and the third potting material 50. This intermediate layer 45 enables the improved adhesiveness between the second potting material 40 and the third potting material 50, to thereby prevent the third potting material 50 from being separated from the second potting material 40.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The submerged-type hollow fiber membrane module according to the present invention can be utilized in the water-treatment field.

The invention claimed is:

1. A submerged-type hollow fiber membrane module comprising:
a module case provided with a water-collecting portion and supporting portions;
a potting member on the supporting portions; and
a bundle of hollow fiber membranes potted in the potting member, wherein one end of each of the hollow fiber membranes is open such that the hollow fiber membranes are in fluid communication with the water-collecting portion,
wherein the potting member comprises:
a first layer of a first potting material on the supporting portions, the first layer having hardness of 95 to 100 Shore A;
a second layer of a second potting material on the first layer, the second layer having hardness of 95 to 100 Shore A;
a third layer of a third potting material, the third layer having hardness of 20 to 40 Shore A; and
an intermediate layer between the second and third layers, the intermediate layer being formed by a substantial chemical combination of the second and third potting materials,
wherein the substantial chemical combination occurs when the third potting material contacts with the second potting material before the second potting material is sufficiently cured to form the second layer, followed by a complete curing of the second and third materials,
wherein the second layer is formed on the first layer after the first potting material is completely cured and the second layer is in contact with the first layer, and
wherein each of the first potting material and the second potting material is an urethane-based resin or an epoxy-based resin, and the first and second potting materials are different from each other.

2. The submerged-type hollow fiber membrane module according to claim 1, wherein the end of each of the hollow fiber membranes is on a same level as a cutting plane of the first layer facing the water-collecting portion such that the end of each hollow fiber membrane does not protrude from the cutting plane.

3. The submerged-type hollow fiber membrane module according to claim 1, wherein the hardness of the third layer is in a range between 20% and 60% in comparison to the hardness of the second layer.

4. A submerged-type hollow fiber membrane module comprising:
a module case provided with a water-collecting portion and supporting portions, said supporting portions being protruded from an inner surface of the module case;
a potting member located in the module case in a way to be placed on the supporting portions; and
a bundle of hollow fiber membranes potted in the potting member, wherein one end of each of the hollow fiber membranes is open such that the hollow fiber membranes are in fluid communication with the water-collecting portion,
wherein the potting member comprises:
a first layer of a first potting material on the supporting portions, the first layer having hardness of 95 to 100 Shore A;
a second layer of a second potting material on the first layer, the second layer having hardness of 95 to 100 Shore A;
a third layer of a third potting material, the third layer having hardness of 20 to 40 Shore A; and
an intermediate layer between the second and third layers, the intermediate layer being formed by pouring a third potting material over a semi-cured second potting material and curing the second and the third potting materials, said semi-curing of the second potting material is performed at a temperature from 20° C. to 60° C. for a period from 3 minutes to 1 hour,
wherein the second layer is formed on the first layer after the first potting material is completely cured and the second layer is in contact with the first layer, and
wherein each of the first potting material and the second potting material is an urethane-based resin or an epoxy-based resin, and the first and second potting materials are different from each other.

* * * * *